Sept. 26, 1972 O. HASSLER Re. 27,487

DIRECTIONAL HEARING AID

Original Filed Dec. 6, 1966

INVENTOR.
OTTO HASSLER

BY Schroeder, Siegfried & Ryan ATTORNEYS

United States Patent Office

Re. 27,487
Reissued Sept. 26, 1972

27,487
DIRECTIONAL HEARING AID

Otto Hassler, Hamburg, Germany, assignor to Willco-Hargerate Medizinische Apparatebau, G.m.b.H., Hamburg, Germany Original No. 3,458,668, dated July 29, 1969, Ser. No. 559,505, Dec. 6, 1966. Application for reissue May 17, 1971, Ser. No. 143,768
Int. Cl. H04r *25/02*
U.S. Cl. 179—107 H 11 Claims

Matter enclosed in heavy brackets [ ] appears in the original patent but forms no part of this reissue specification; matter printed in italics indicates the additions made by reissue.

ABSTRACT OF THE DISCLOSURE

A directional hearing aid with two microphones mounted in back to back relationship. An acoustic resilient seal disposed around the aperture between one of the microphones and a forward facing opening in the housing. A flexible conduit is disposed between the other microphone and a rearward facing opening in the hearing aid.

Figure 1:
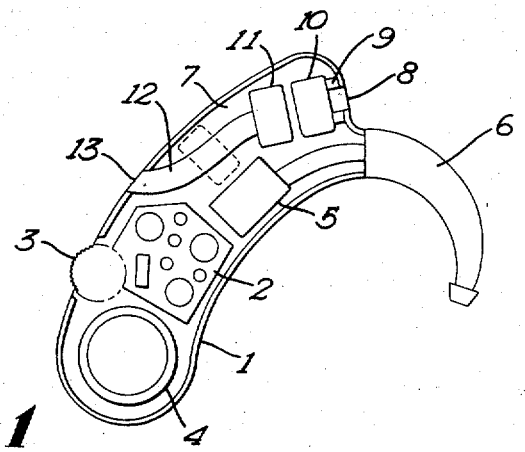

People hard of hearing often find fault with their hearing aid in that it does not give them any indication as to the direction from which the sources of sounds emanate. People wearing such hearing aids, even of the spectacle type or hearing aids [form] *worn* behind the ear, are not in the habit of turning their head in the direction of the sound they hear, because they generally use their eyes to assist their hearing, and thereby obtain the known advantageous effect of simultaneously sensing an event with both organs.

It is general knowledge that the sound pick-up characteristics of the microphone employed in the hearing aids is such that sound may be picked up from all directions which causes the apparatus to receive the sound equally well no matter from which direction it may come.

Because of the general microphone characteristics a directional sound detection is excluded and causes considerable difficulties in noisy rooms or, if several people are participating in a discussion and all speaking at the same time. The condition is made worse when a person hard of hearing in both ears wears a hearing aid for one ear only.

The present invention contemplates a combination of two hearing aid microphones suitably used as a electro-acoustic transducer for a hearing aid, the microphones being arranged in such a manner that they lie in a back-to-back relationship. Furthermore, in accordance with the invention, the directional effect may be obtained by arranging a microphone behind a forwardly directed sound opening and in front of a sound passage opening to the rear of the housing, whereby the sound is conveyed to the microphone primarily and directly from the source of the sound and additionally in the opposite direction therefrom.

It is therefore a general object of this invention to provide a hearing aid to be worn on a person's head as a behind-the-ear type hearing aid or spectacles type hearing aid, having an electro-acoustic transducer with directional sound receiving openings arranged in such a manner that the sound appears to come from the direction in which the person wearing the hearing aid is looking.

It is a more specific object of this invention to provide apparatus making it possible for the person wearing the hearing aid to locate a source of sound waves by hearing alone in detecting the direction from which the sound is most strongly transmitted.

It is still a further object of this invention to provide a transducer having compound diaphragms, one of which is controlled through an aperture and the other of which is controlled through a conduit.

It is still another object of this invention to provide apparatus in which the amplitude of sound from opposite directions received by the apparatus is controlled by the length of the sound conduit leading to the apparatus.

Figure 2:
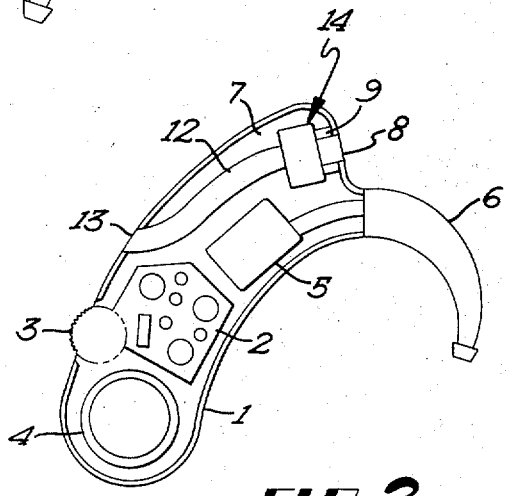
Figure 3:
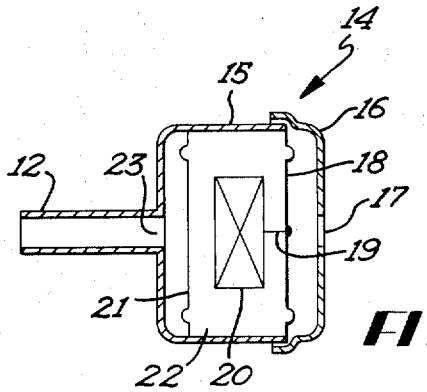
Figure 4:
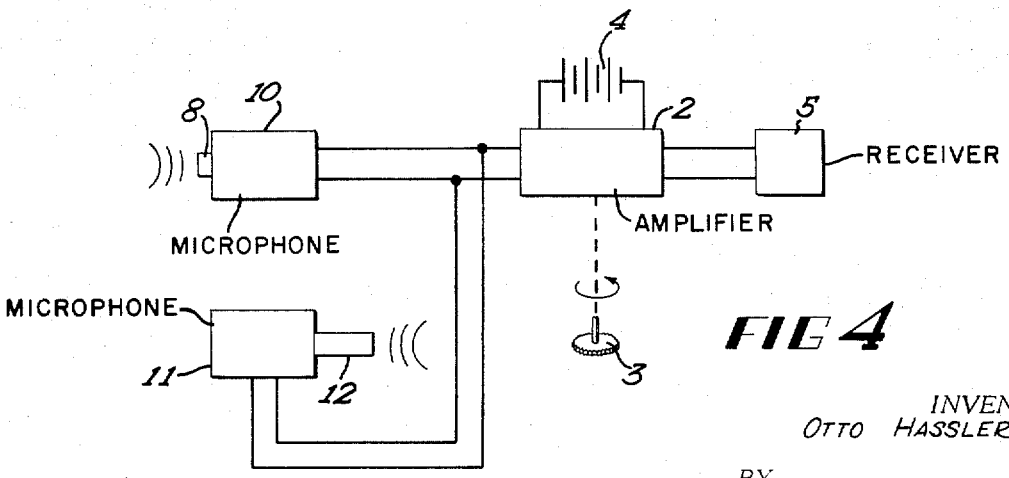

These and other objects and advantages of the invention will more fully appear from the following description, made in connection with the accompanying drawings, wherein like reference characters refer to the same or similar parts throughout the several views, and in which:

FIGS. 1 and 2 [shown] *show* diagrammatic sectional views respectively taken along the longitudinal center line through a behind-the-ear type hearing aid employing a pair of microphones and a single microphone respectively;

FIG. 3 shows a sectional view of the microphone apparatus in accordance with FIG. 2 taken along the longitudinal center line; and FIG. 4 is a block diagram of the hearing aid circuit employing the special transducer used therein.

The apparatus as shown in FIGS. 1 and 2 shows generally the invention as it is used. A housing 1 which is used to house the hearing aid in a behind-the-ear type hearing aid is curved and adapted to lie behind the auricle of the ear in a manner generally well known. An amplifier 2 is contained within the hearing aid having a volume control 3 connected thereto. A battery 4 supplies power to the amplifier and a receiver 5 is driven by amplifier 2. A hook shaped extension 6 of case or housing 1 serves to hold the apparatus over the ear and to pass the sound from the receiver 5 into the ear of the person wearing the hearing aid.

As shown in FIG. 1, an opening or aperture 8 is provided in a chamber 7 of the hearing aid housing, the opening 8 facing forwardly in the same direction as the wearer's eye detects visible objects. A transducer is formed from a pair of microphones 10 and 11 which may be of the type generally known to those skilled in the art which is arranged in a space or chamber 7 behind opening 8. Microphone 10 is acoustically secured to the housing through the use of a seal 9. On the other hand, microphone 11 is secured in a "back-to-back" relationship with a microphone 10 and a conduit or passage 12 is disposed approximately in the longitudinal center plane of the housing and is directed rearwardly to an opening 13 formed in housing 1. The passage or conduit 12 is formed of a small tube of elastic material to avoid an acoustic coupling with the housing. That is, the feed-back from a mechanical vibration is reduced as much as possible through the use of the flexible tubing. Thus sound enters opening 8 from the front and is applied directly to microphone 10 while sound may enter the rearwardly facing microphone 11 through opening 13 and a rather long passage formed by the small tube. The electrical outputs of both microphones are connected to amplifier 2 in a circuit arrangement to produce a signal which is the combination of the two sounds detected by microphones 10 and 11 respectively. Thus it will be seen that very little sound will be detected from a transverse direction of the microphone openings while the maximum sound detection will occur at microphone 10 and a secondary sound detection will occur at the microphone 11. It will be understood that the opening for microphone 11 and the passage 12 or flexible tubing are of such size that the sound received from the rearward direction is of a smaller amplitude than that received through the front opening 8 and as detected by microphone 10. Using this type of an arrangement, the direction of the sound as detected by the wearer becomes very perceptible. Using this arrangement, the person wearing such a hearing aid is afforded a possibility of sensing the direction from which the sound emanates so that the person may turn his head in the direction from where the sound appears to be generated and the detection of the sound source may be aided by the visual sense of the person wearing the hearing aid. The difference in the amplitude of the signals transmitted from the two microphones may be varied by changing the relative position of [micropone] *microphone* 11 with respect to microphone 10 such as shown in the dotted lines within chamber 7 and correspondingly shortening tube 12.

The embodiment shown in FIG. 2 [make] *makes* use of a single microphone or transducer 14 and is shown in more detail in FIG. 3. Microphone 14 is secured in chamber 7 of the housing 1 directly behind the main opening 8 which faces forwardly. Microphone 14 will now be described in more detail wherein a body 15 has a cover portion 16 secured thereto having an opening or aperture 17 which lies opposite opening 8 of the housing 1. A diaphragm 18 is secured to body 15 and will oscillate with the pressure of the sound waves impinging thereupon. The mechanical oscillations are transferred to the magnetic system 20 through a coupling pin 19 and the magnetic system is connected with amplifier 2 in a normal manner. A second diaphragm 21 is secured on the opposite side of magnetic system 20 and diaphragm 21 is coupled with main diaphragm 18 by the volume of air trapped in a resonance chamber 22 which is the chamber between the two diaphragms. Sound is directed to diaphragm 21 through a rearward opening 23 which is connected with the rearward housing opening 13 (FIG. 2) through the use of the flexible tubing 12. By the use of this type of a transducer, the sound waves coming from a position which is transverse to the direction of orientation of the two microphone openings is acoustically reduced or distinguished and the sound waves entering through the front openings 8 and 17 produce a signal of greater magnitude than that received through openings 13 and 23, thus providing a device which is sound sensitive and direction oriented.

By the use of the transducers just described, the characteristics of the apparatus is such that the sound pick-up has a pattern with lobes such as found in the FIG. 8 with the front lobe being considerably larger than the lobe to the rear thus providing a maximum degree of sensitivity towards the front. By selecting the proper length and diameter of the passage or tube 12, the shape of the lobes and range of frequencies which are detectable may be varied. It will also be recognized that by changing the dimensions of the resonant chamber in the microphone housing, the characteristics may also be altered.

It should also be recognized that the invention may be used in the same manner as that just described with a spectacle type hearing aid or any other hearing [air] *aid* which is worn on the head of a person.

Thus it will be recognized that by the use of the present invention, the sound coming from a predominant source may be readily detected and may be aided by the visual senses of the wearer in detecting the source of sound. It will be recognized that by providing a hearing aid in which the microphone has both forwardly and rearwardly facing apertures, a truer "sound picture" is obtained.

It will also be recognized that in the use of the transducer, [that] several variations may be made such as that shown in FIG. 4 where microphones 10 and 11 are connected to the circuit or where a single microphone such as 14 may be connected to the input of amplifier 2.

It will, of course, be understood that various changes may be made in the form, details, arrangement and proportions of the parts without departing from the scope of my invention which consists of the matter shown and described herein and set forth in the appended claims.

What is claimed is:

1. In a hearing aid housing to be worn on the head of the wearer containing an amplifier connected to a source of electrical energy and a hearing aid receiver, a transducer comprising:

(a) a microphone mechanism having a pair of apertures disposed in spaced and confronting relationship with a pair of diaphragm members adapted to be moved by sound waves, said mechanism being secured in the hearing aid housing;

(b) an acoustic seal disposed around one of said apertures between said microphone mechanism and said hearing aid housing, said housing having an opening facing forwardly when said hearing aid housing is worn;

(c) and a flexible conduit secured to said microphone mechanism and disposed in confronting relationship with said other aperture, said conduit communicating with a rearward facing opening in said hearing aid housing when worn.

2. The invention as set forth in claim 1 wherein said microphone mechanism includes:

(d) a pair of microphones mounted back-to-back in confronting relationship with the apertures of each facing forwardly and rearwardly, and electrically connected to each other in signal aiding relationship.

3. The invention as set forth in claim 2 wherein:

(e) said microphones are disposed in spaced relationship with said rear aperture being further from said rearward facing opening than said front aperture is from said front opening.

4. The invention as set forth in claim 1 wherein:

(f) said flexible conduit has a greater axial length than said seal between said microphone mechanism and said respective openings in said hearing aid housing.

5. The invention as set forth in claim 1 wherein said flexible conduit includes:

(g) sound [reducting] *reducing* means causing the electrical output signal from said microphone mechanism sensing sound from the rear of said hearing aid housing to have a smaller magnitude than that sensing [around] *sound* from the front of said hearing aid.

6. The invention as set forth in claim 1 wherein said microphone mechanism includes:

(h) a single microphone having a pair of diaphragms with a resonant chamber therebetween.

7. The invention as set forth in claim 6 wherein said microphone mechanism includes:

(i) a magnetic system producing output signals representative of sound waves;

(j) and a coupling device coupling one of said [pairs] *pair* of diaphragms to said magnetic system.

*8. A hearing aid to be worn on a person's head in a predetermined position to have a fixed fore and aft orientation relative to the head,*

*the hearing aid having a housing and having a transducer and amplifier means within the housing for the hearing aid, said transducer and amplifier means including a microphone to detect and pick up sounds from sources both fowardly and rearwardly of the hearing aid and there being passages opening both forwardly and rearwardly to the microphone, the passage opening from the rearward direction being of such length and size as to restrict transmittal of sound to the microphone as compared to the size of the forwardly facing passage to thereby produce a directional effect.*

*9. A directional hearing aid comprising:*

*a housing for the hearing aid and shaped to be carried on the head with a fore and aft orientation, the housing having a pair of sound inlet ports, one of the ports being located rearwardly of the other of the ports,*

*transducer and amplifier means for the hearing aid and including a single microphone means having a pair of sound inlets each communicating with a respective port of the housing, said microphone means being capable of discriminating between the sounds enter-*

*ing the respective ports for a direction detecting effect.*

*10. A hearing aid to be worn on a person's head in predetermined orientation to have a fixed fore and aft orientation relative to the head,*

*the hearing aid having a housing and having a transducer and amplifier means within the housing for the hearing aid, said transducer and amplifier means including a microphone having sound responsive diaphragm means to detect and pick up sounds and vibrate in response to such sounds from sources both forwardly and rearwardly of the hearing aid, and there being passages opening both forwardly and rearwardly to opposite sides, respectively, of the diaphragm means of the microphone, the passage opening from the rearward direction being of such length and size as to restrict transmittal of sound to the diaphragm means as compared to the size of the forwardly facing passage to thereby produce a directional effect.*

*11. A directional hearing aid comprising:*

*a housing for the hearing aid and shaped to be carried on the head with a fore and aft orientation,*

*transducer and amplifier means for the hearing aid and including a microphone means within the housing, the microphone means having sound-responsive diaphragm means to detect and pick up sounds and vibrate in response to such sounds from sources both forwardly and rearwardly of the housing and there being passages opening both forwardly and rearwardly of the housing from the interior of the microphone to supply sounds from both forward and rearward directions to the diaphragm means, and the passage opening from the rearward direction being of such length and size as to restrict transmittal of sound to the diaphragm means as compared to the size of the forwardly facing passage to thereby produce a directional effect.*

References Cited

The following references, cited by the Examiner, are of record in the patented file of this patent or the original patent.

UNITED STATES PATENTS

| | | | |
|---|---|---|---|
| 3,243,525 | 3/1966 | Eaton | 179—107 R |
| 2,463,762 | 3/1949 | Giannini | 179—179 G |
| 2,220,208 | 11/1940 | Cannon. | |
| 2,783,312 | 2/1957 | Movzon. | |
| 2,989,597 | 6/1961 | Victoreen. | |

FOREIGN PATENTS

| | | |
|---|---|---|
| 1,119,918 | 12/1961 | Germany. |

KATHLEEN H. CLAFFY, Primary Examiner

T. L. KUNDERT, Assistant Examiner

U.S. Cl. X.R.

179—121 D, 1 DM